(12) United States Patent
Dunn

(10) Patent No.: US 10,558,716 B2
(45) Date of Patent: Feb. 11, 2020

(54) ADAPTIVE CONTENT-BASED PUBLISH/SUBSCRIBE MESSAGING

(75) Inventor: Tim Dunn, Warnford (GB)

(73) Assignee: International Business Machines Corporation, Armonk, NY (US)

(*) Notice: Subject to any disclaimer, the term of this patent is extended or adjusted under 35 U.S.C. 154(b) by 1617 days.

(21) Appl. No.: 13/226,288

(22) Filed: Sep. 6, 2011

(65) Prior Publication Data

US 2012/0079044 A1    Mar. 29, 2012

(30) Foreign Application Priority Data

Sep. 29, 2010   (EP) .................................. 10182332

(51) Int. Cl.
| | | |
|---|---|---|
| G06F 16/9535 | (2019.01) | |
| G06F 11/34 | (2006.01) | |
| H04L 29/08 | (2006.01) | |
| G06F 9/54 | (2006.01) | |
| H04L 12/807 | (2013.01) | |
| H04L 12/801 | (2013.01) | |

(52) U.S. Cl.
CPC .......... *G06F 16/9535* (2019.01); *G06F 9/542* (2013.01); *G06F 11/3409* (2013.01); *H04L 47/12* (2013.01); *H04L 47/27* (2013.01); *H04L 67/2842* (2013.01)

(58) Field of Classification Search
CPC ......... H04L 47/30; H04L 47/20; H04L 47/29; H04L 47/32; H04L 47/50; H04L 49/103; H04L 49/503; H04L 41/0604; G06F 9/542
USPC ................................................ 709/206, 207
See application file for complete search history.

(56) References Cited

U.S. PATENT DOCUMENTS

| | | | |
|---|---|---|---|
| 2003/0061365 A1* | 3/2003 | White ................. | G06F 21/6218 709/229 |
| 2003/0115317 A1* | 6/2003 | Hickson et al. ............. | 709/224 |
| 2003/0135556 A1* | 7/2003 | Holdsworth ................. | 709/206 |
| 2005/0198285 A1* | 9/2005 | Petit ............................. | 709/225 |

(Continued)

FOREIGN PATENT DOCUMENTS

| | | |
|---|---|---|
| CN | 101159711 A | 4/2008 |
| CN | 101510213 A | 8/2009 |

OTHER PUBLICATIONS

International Search Report and Written Opinion for International Application No. PCT/EP2011/064187 dated Oct. 6, 2011.

(Continued)

*Primary Examiner* — Barbara B Anyan
(74) *Attorney, Agent, or Firm* — Winstead, P.C.

(57) ABSTRACT

A method, system, and computer program product for publish/subscribe messaging. A subscription is initiated, including designating a subscription queue to which published messages relating to the subscription are to be put. Multiple content-based filtering expressions are defined for the subscription, each of the filtering expressions being defined for a given utilization of the subscription queue. Furthermore, in another aspect, a published message relating to a subscription is received. The utilization of a subscription queue designated in the subscription is checked. A content-based filtering expression defined for the given utilization of the subscription queue is determined. The content-based filtering expression may then be applied.

20 Claims, 4 Drawing Sheets

FIG. 1

(56) References Cited

U.S. PATENT DOCUMENTS

| | | | |
|---|---|---|---|
| 2006/0179059 A1 | 8/2006 | Reed et al. | |
| 2007/0083866 A1* | 4/2007 | Mani | G06F 9/542 |
| | | | 718/102 |
| 2007/0121499 A1* | 5/2007 | Pal | H04L 45/60 |
| | | | 370/230 |
| 2008/0037553 A1* | 2/2008 | Gilmartin | H04L 41/082 |
| | | | 370/395.41 |
| 2008/0065604 A1 | 3/2008 | Tiu et al. | |
| 2010/0198920 A1 | 8/2010 | Wong et al. | |
| 2010/0329114 A1* | 12/2010 | Chesson | H04L 47/27 |
| | | | 370/232 |
| 2011/0158248 A1* | 6/2011 | Vorunganti et al. | H04L 47/12 |
| | | | 370/412 |

OTHER PUBLICATIONS

Jaeger, Michael, "Self-Organizing Publish/Subscribe," 2nd International Doctoral Symposium on Middleware '05, Nov. 28-Dec. 2, 2005.

Examination Report for United Kingdom Application No. GB1306652.7 dated Apr. 25, 2013.

* cited by examiner

ADAPTIVE CONTENT-BASED PUBLISH/SUBSCRIBE MESSAGING

CROSS-REFERENCE TO RELATED APPLICATIONS

This application claims priority under 35 U.S.C. § 119(a) from European Patent Application No. 10182332.6, filed on Sep. 29, 2010, the contents of which are incorporated herein by reference.

TECHNICAL FIELD

The present invention relates to the field of publish/subscribe messaging, and more particularly, to adaptive content-based publish/subscribe messaging.

BACKGROUND

The publish/subscribe processing model is one in which producers of information (publishers) and consumers of that same information (subscribers) are not directly connected to each other. The passage of information between the two parties is handled by a publication engine or broker. The publication engine or broker has the responsibility of matching interested parties with the information being published. As not all subscribers necessarily want to receive all published messages, the techniques of topic and content-based routing are used to control what information a subscriber receives.

Topic based routing uses a simple classification mechanism which is implemented as a hierarchal tree. A subscriber can subscribe to receive messages at a particular point in that tree. It could be the root and so all messages are received, or it could be a leaf node in which case only messages published to the leaf node will be received.

Content-based routing provides a mechanism whereby a subscriber can provide a filter expression that will be applied to all messages that match the named point in the topic tree. This filter is typically a Structured Query Language (SQL) like expression that will reference information in the header or body of the message. If the filter condition evaluates to true, then the published message is written to the subscribers queue. If it evaluates to false, then it is not written to the subscribers queue.

Content-based filtering is useful in that it provides an additional filtering mechanism. In current implementations, only one filter expression is supplied, although this could be a complex expression. Although the application designer or business user can think carefully about the construction of the filter statement for the subscriber, this one filter is the only mechanism available to control the amount of information received since they cannot influence the rate at which published messages are made.

When a subscriber's nominated queue becomes full of published messages, no more messages can be received until either the queue size is increased, the subscribing application consumes messages off the queue, or an operator or automated command clears some or all messages off the queue.

BRIEF SUMMARY

In one embodiment of the present invention, a method for publish/subscribe messaging comprises initiating a subscription comprising designating a subscription queue to which published messages relating to the subscription are to be put. The method further comprises defining, by a processor, multiple content-based filtering expressions for the subscription, each of the filtering expressions being defined for a given utilization of the subscription queue.

Other forms of the embodiment of the method described above are in a computer program product and in a system.

In another embodiment of the present invention, a method for publish/subscribe messaging comprises receiving a published message relating to a subscription. The method further comprises checking a utilization of a subscription queue designated in the subscription. Additionally, the method comprises determining a content-based filtering expression defined for the utilization of the subscription queue. In addition, the method comprises applying, by a processor, the content-based filtering expression.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
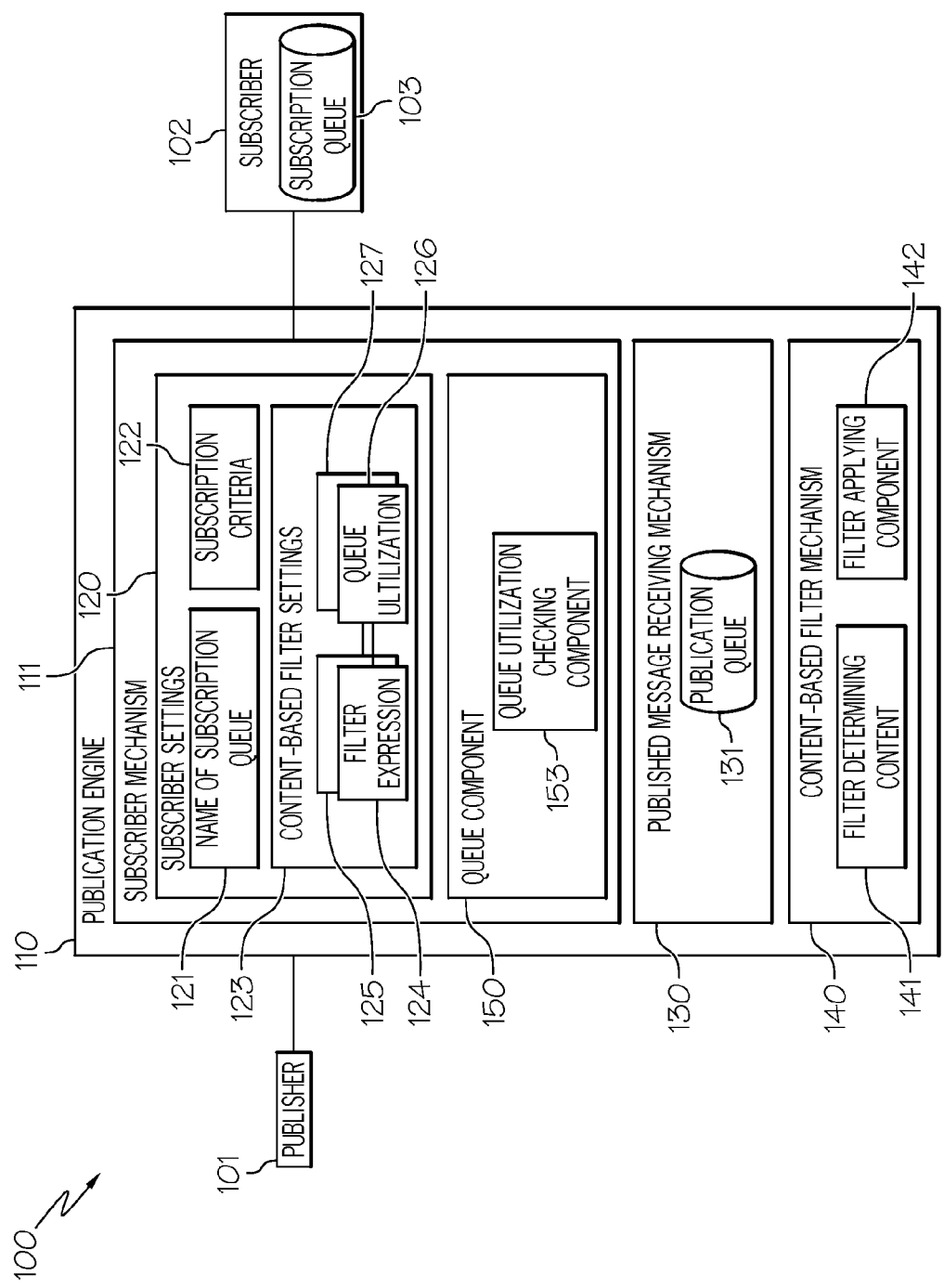
FIG. 1 is a block diagram of a system in accordance with an embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Conventional topic and content-based publish/subscribe processing does not take account of the amount of data already on a queue and perhaps more importantly how close to the capacity of the queue the current queue depth is. When the subscriber's queue fills, typically what will happen is that the publication engine will rollback the published message if the message is persistent and transacted, or the message will be lost if it is non-persistent. Therefore, published messages may be received and processed on an unpredictable basis which is not desirable. Conventionally, the subscribing application has no ability to change the filter expression as the queue limit begins to be approached.

A user, for example, a business user or application designer, who is the subscriber may be happy for the content filter to be become more restrictive if they know the queue is reaching capacity, rather than continuing to loose all published messages from the point at which the queue is full.

It would be valuable for the user to have more influence over what is kept and what is discarded as the subscription queue fills, rather than have a condition imposed by the transactional behavior of the publication engine.

The described system and method provide a mechanism to allow the user to supply a series of filters for content-based publish/subscribe to take account of higher queue utilizations. The execution of a particular filter is dependent on the utilization of the individual subscription queue. This utilization is determined by the publication engine and the appropriate filter executed at the time of published message. Subscription queue utilization may include: remaining queue capacity, queue rate of use, amount of data currently on queue, or any other method of measuring the queue usage.

By being more restrictive in the filter expression, it is possible for a user to specify that fewer or even no new messages be accepted once a certain queue utilization had been reached. This gives the power of whether to accept more published messages to the user rather than having it imposed on them because the subscription queue has filled.

The advantage is that the subscribing application will in effect still continue to see new published messages for much longer as the queue full condition will have been averted for much longer by reducing the rate at which new published messages are accepted onto the subscription queue.

In the described method and system, when providing a filter for content-based publish/subscribe, the subscriber specifies a set of filter expressions and queue utilizations (or other queue threshold/characteristics) at which to apply each filter expression.

The subscriber provides the filters but does not implement them. The publication engine is responsible for applying the different filters. Prior to invoking a filter for the content-based published message, the publication engine checks the queue utilization of the subscription queue and then applies the appropriate filter.

Only the subscriber user understands the business context of the information being consumed and so is the only one capable of making a judgment about how restrictive he is prepared to be in order to try and avoid the queue full condition whilst seeing as many new published messages as possible.

Referring to FIG. 1, a block diagram shows an example system 100 for adaptive content-based publish/subscribe messaging in accordance with an embodiment of the present invention.

A publication engine 110 is provided as an intermediary between publishers 101 and subscribers 102. A subscriber 102 registers with a publication engine 110 which provides routing and filtering between publishers 101 and subscribers 102. In some cases, there may be a publication engine that performs publish/subscribe processing only. In another case, a publish/subscribe function may be provided as one of a number of functions in a multi-function broker. The term publication engine is intended to include any publish/subscribe processing mechanism including a message broker.

A publication engine 110 includes a subscriber mechanism 111 at which a subscriber 102 registers a subscription. The subscriber mechanism 111 includes subscriber settings 120 including the name 121 of the subscription queue 103 to receive published messages and the subscriber criteria 122. The subscriber criteria 122 includes the topic or topics of the published messages the subscriber is interested in.

The subscription queue 103 is the destination to which the publication engine 110 sends messages matching a particular subscription. When a subscriber 102 registers to a topic, it indicates to the publication engine 110 to which queue it wants published messages to be forwarded. One queue may be used by several registrations. This queue is specified in one of the parameters of the register subscriber command.

In addition, in the described system 100 the subscriber settings 120 of the subscriber mechanism 111 include content-based filter settings 123 including multiple filter expressions 124, 125 to be applied at different subscription queue utilizations 126, 127.

The publication engine 110 includes a published message receiving mechanism 130 for receiving published messages from publishers 101 and determining subscriptions to the published messages. The published message receiving mechanism 130 includes a publication queue 131 for receiving published messages at the publication engine 110.

The subscriber mechanism 111 includes a queue component 150 for holding messages to be put to the subscription queue 103. In an example implementation, an area of disk is set aside to hold messages for a particular queue. Messages are forwarded to the subscription queue 103 when a communication program and link are available. The queue component 150 tracks the current queue depth for a subscription queue 103 as it sees all write requests and all retrieve requests against that queue including the number of bytes in the messages. A queue utilization checking component 153 calculates the subscription queue 103 utilization before putting a message to the subscription queue 103.

In one embodiment, the publication engine 110, publisher 101 and subscriber 102 may optionally include queue managers for managing their local queues.

A content-based filter mechanism 140 is provided including a filter expression determining component 141 for determining which of the filter expressions 124, 125 to apply based on the subscription queue 103 utilization determined by the queue utilization checking component 153 and a filter applying component 142.

The filter mechanism 140 receives a published message from a publisher 101, identifies a subscription in the subscriber mechanism 111 for which the message is valid. The filter mechanism 140 then obtains the name of the subscription queue 103 and the queue utilization checking component 153 checks the utilization of the queue before the filter applying component 142 applies the appropriate content-based filter setting for the queue utilization as specified in the content-based filter settings 123.

Figure 2:
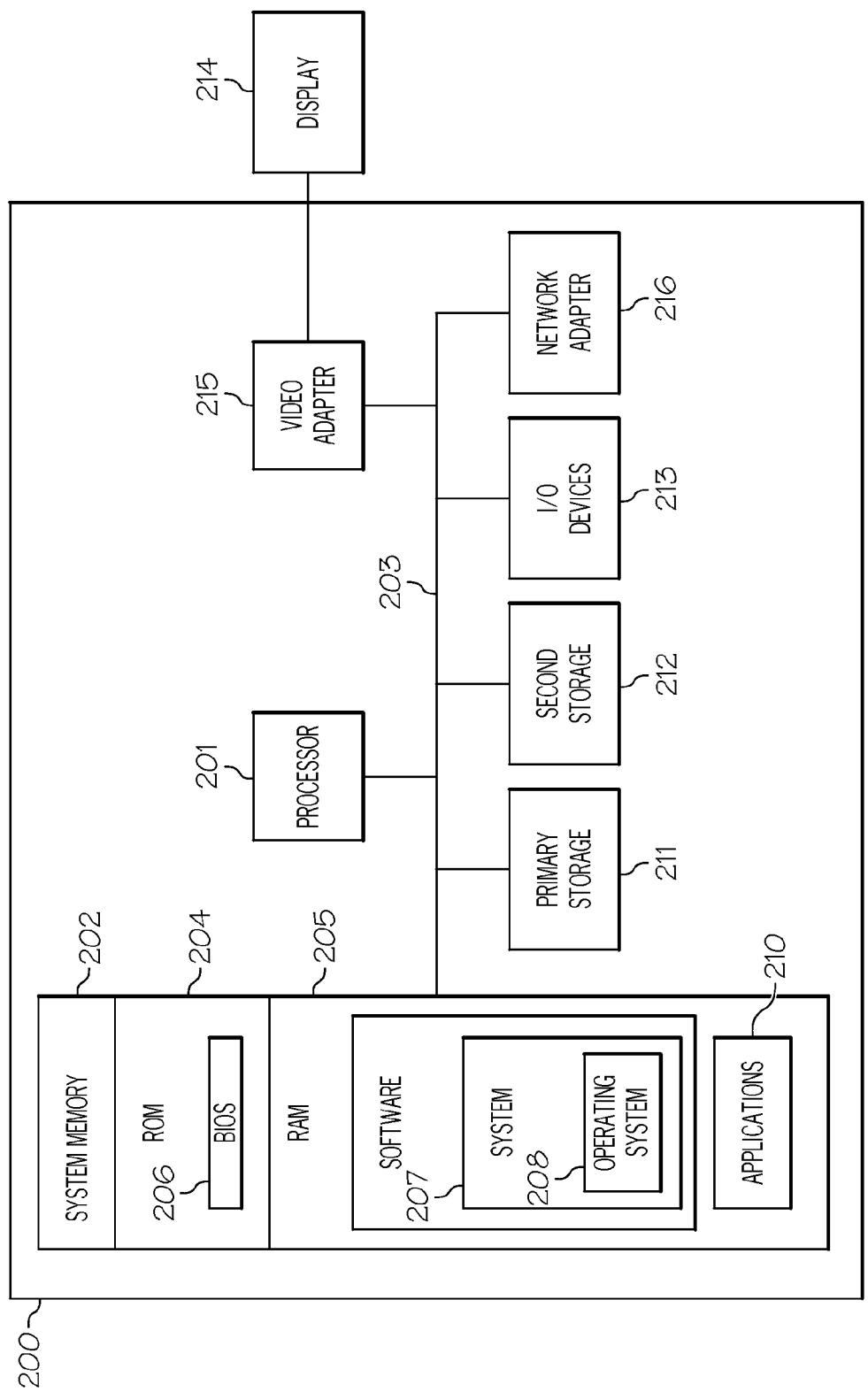
FIG. 2 is a block diagram of an embodiment of the present invention of a computer system.

Referring to FIG. 2, FIG. 2 illustrates a data processing system 200 suitable for storing and/or executing program code in accordance with an embodiment of the present invention. Data processing system 200 includes at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211, such as a magnetic hard disk drive, and secondary storage means 212, such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Implementations of a data processing system may not have all the above components. There are small or micro brokers running on limited capacity devices, such as phones or pipeline monitoring devices, which could use the described system and which may have a limited set of the described functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Figure 3:
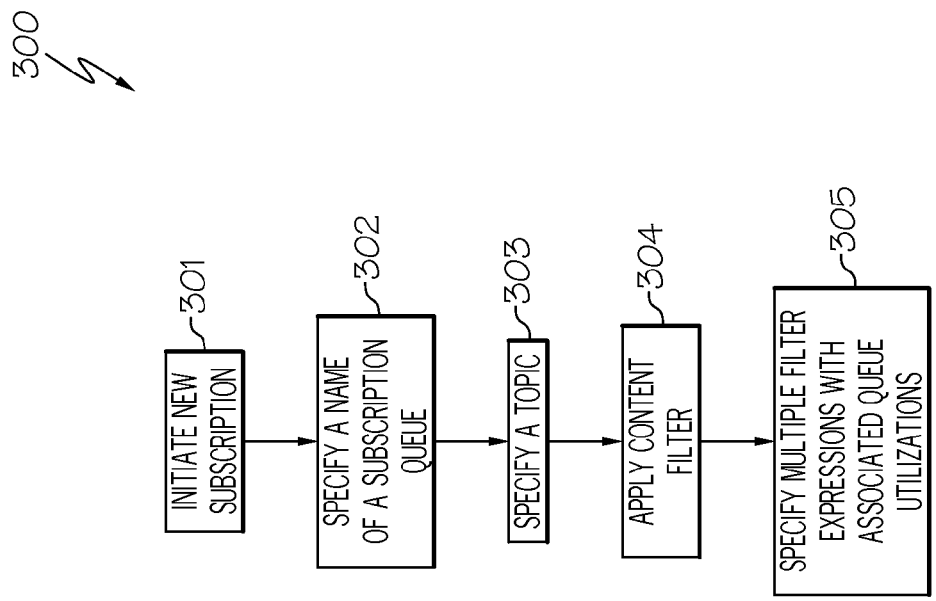
FIG. 3 is a flowchart of a method of the registration of a subscriber in accordance with an embodiment of the present invention.

Referring to FIG. 3, a flow diagram 300 shows an embodiment of the present invention of the registration of a subscriber in the described method and system. A new subscription is initiated in step 301. In step 302, the subscription specifies a name of a subscription queue for receiving the messages. In step 303, the subscription specifies a topic. In step 304, a content filter is applied on top of the topic based subscription, and, in step 305, the content filter specifies multiple filter expressions with associated queue utilizations.

Figure 4:
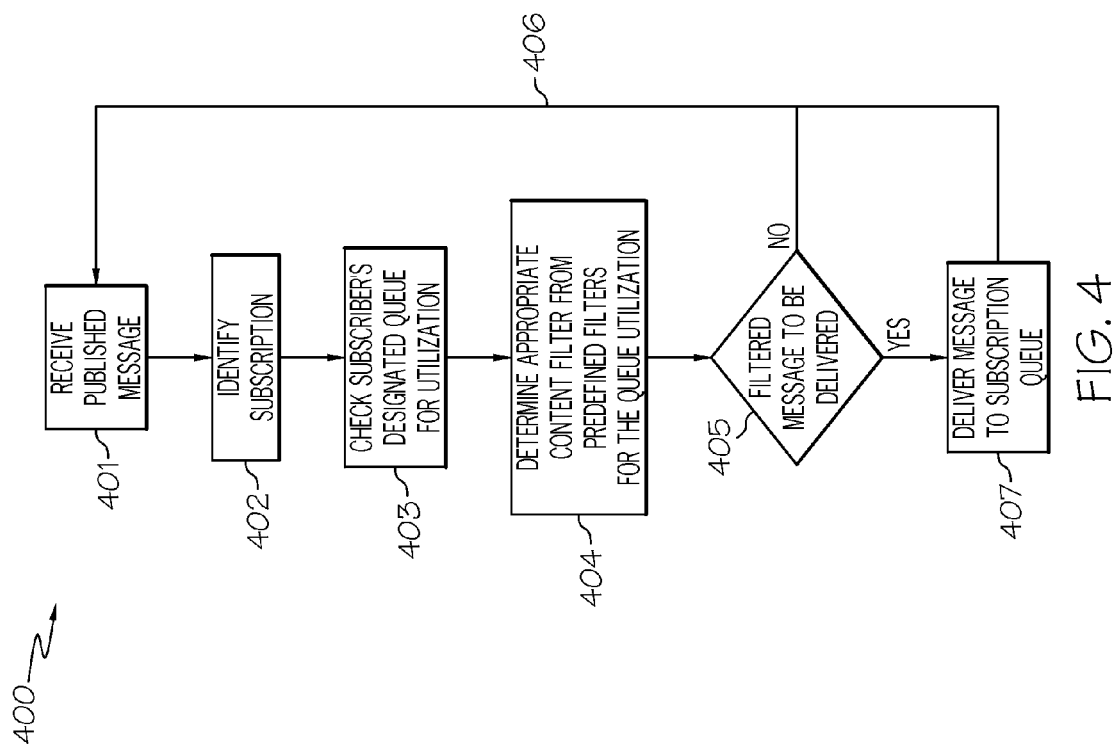
FIG. 4 is a flowchart of a method of message filtering in accordance with an embodiment of the present invention.

Referring to FIG. 4, a flow diagram 400 shows an embodiment of the present invention of message filtering at a publication mechanism in the described method and system. A published message is received in step 401 and a subscription is identified in step 402. The subscription may be for specified topics.

The subscription queue designated in the subscription is checked in step 403 for its utilization or capacity. Given a certain queue utilization, an appropriate content filter is determined in step 404 from predefined filter expressions.

In step 405, it is determined from the content filter if the message is to be delivered to the subscriber. If the message is not to be delivered, then the process loops 406 to await the next message. If the message is to be delivered, then, in step 407, the message is placed on the subscription queue and the process loops 406 to await the next message.

Allowable languages for expressing the logic needed by the publication engine for content-based filtering vary depending on the implementation of the publication engine. In one example, message selectors may allow the use of embedded SQL (ESQL) expressions to filter on an entire message.

Content filtering requires a method of pointing to portions of the header and body of a message that is to be published. In one implementation, field references are used in filters for content-based filtering. To reference a field in a filter, a path must be specified. Each element of the path consists of a, possibly indexed, field name.

The following are example field name and correlation name identifiers as an example implementation. These identifiers represent all messages as a hierarchical syntax element tree. Each path identifies a route through that tree, which leads to a particular syntax element, starting from one of the predefined correlation names that refer to fixed points that every message has. The following correlation names shown in Table 1 are supported for content-based filtering.

TABLE 1

| | |
|---|---|
| Root | Identifies the root of a published message. |
| Properties | Identifies the portion of the message in which the standard properties of a message lie. |
| Body | Identifies the last child of the root of the message, which is usually, but not always, the application data that follows any headers. |

Some examples of field references, together with their meanings, are shown in Table 2.

TABLE 2

| | |
|---|---|
| Body.Person.Address | Refers to the first Address field in the Person entity in the body of the message. |
| Properties.Topic | Refers to the "Topic" field in the standard properties of a message. |
| Root.MQMD.UserIdentifier | Refers to the UserIdentifier field in the MQMD of the message. |

Some examples of content-based filtering are shown in Table 3.

TABLE 3

| | |
|---|---|
| Body.Person.Salary>10000 | Filtering against an integer literal |
| "Body.Person.Address"[1]NOT LIKE 'Blen%' AND"Body.Person.Salary">15000 | A more complex filter. Note that field identifiers can optionally be surrounded by double quotation marks. |
| Body.Date1='2000-02-14' | Filtering against a date. The date is matched as a string and care must be taken with its lay out. |
| Body.Person.ApprovalFlag | Filtering against a Boolean field. |
| Body.Person.Salary+Person.Bonus>Body.Person.Limit | An arithmetic filter. |
| Properties.Topic='employees/marketing' | Filtering on a message property. |
| Root.MQMD.UserIdentifier='Jones' | Filtering on a message attribute. |
| Body.Person.HourlyRate = 10.24 | Filtering against a float literal |
| Body.Planet.DistanceFromSun = 0.93E8 | Filtering against a float literal in exponential format |

In the described method and system, the content-based filter includes multiple filter expressions which are applied depending on the utilization of the subscription queue. The utilization of the subscription queue may be defined, for example, in terms of percentage capacity used.

For example, if a filter integer range is provided, the range may become more restricted as the queue utilization increases. In this way, more selective filtering is carried out as the subscription queue utilization increases and has reduced capacity.

Examples

In a first example, a system looks at the spending habits of shoppers. The subscriber wants to capture details of all shoppers spending more than $100 at a time for further analysis of their spending habits. As the subscriber queue depth increases as utilization grows, the subscription filter adapts to only capture the very high spending shoppers. A business decision was made when the filter was constructed to loose the lower spending shoppers under such circumstances. However, the subscriber certainly does not want to risk loosing the very high spending shopper and this is reflected in the construction of the filter.

If Message.Body.ReceiptTotal>$100 as the content filter default expression;

If Message.Body.ReceiptTotal>"2*$100" if the queue utilization hits 70%;

If Message.Body.ReceiptTotal>"3*$100" if the queue utilization hits 90%;

If Message.Body.ReceiptTotal>"30*$100" if the queue utilization hits 95%.

A second example is a system which wants to capture stocks whose price varies significantly one from one day to the next so that analysis of these stocks can be made, possibly with a view to trading them in the future.

Initially, the subscriber is happy to capture those with a variation on +/−5%. However, as the queue depth decreases due to utilization increases, the subscriber is prepared to only capture only the most volatile. Again a business decision was made when constructing the filter that meant it was acceptable to discard more data in order to capture only the most volatile.

If Message.Body.PriceSwingToday>5% as the content filter default expression;

If Message.Body.PriceSwingToday>"2*5%" if the queue utilization hits 70%;

If Message.Body.PriceSwingToday>"3*5%" if the queue utilization hits 90%;

If Message.Body.PriceSwingToday>"10*5%" if the queue utilization hits 95%.

In these examples, as the queue utilization has grown, the filter has only accepted larger and larger values. This is not always going to be the case. In other situations, it may be appropriate to accept only smaller and smaller values as the queue utilization grows.

In these examples, a threshold value is set as a parameter (in the first example, the spending value, and in the second example, the variation value) and the filter expressions are varied according to a multiple of the threshold value. This is one example of how the filter expressions may be varied in relation to queue utilization. Other methods may also be used.

An adaptive content-based publish/subscribe system may be provided as a service to a customer over a network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently utilizing a subscription queue, the method comprising:
   receiving, by a publication engine, a set of filter expressions and utilizations of said subscription queue at which to apply each filter expression, wherein said subscription queue stores messages matching a subscription, wherein said publication engine is an intermediary between publishers and subscribers;
   receiving a published message relating to said subscription;
   checking, by said publication engine, said subscription queue designated in said subscription for its utilization in response to receiving said published message;
   determining, by said publication engine, an appropriate filter expression from said set of filter expressions to be utilized based on said utilization of said subscription queue; and
   applying, by said publication engine, said appropriate filter expression from said set of filter expressions.

2. The method as recited in claim 1, wherein said publication engine comprises a subscriber mechanism at which a subscriber registers said subscription.

3. The method as recited in claim 2 further comprising:
   identifying said subscription in said subscriber mechanism for which said published message is valid in response to receiving said published message.

4. The method as recited in claim 2, wherein said subscriber mechanism comprises subscriber settings comprising a name of said subscription queue to receive published messages and subscriber criteria.

5. The method as recited in claim 4, wherein said subscriber criteria comprises one or more topics of interest of said subscriber.

6. The method as recited in claim 4, wherein said subscriber settings further comprise content-based filter settings comprising multiple filter expressions to be applied at different subscription queue utilizations.

7. The method as recited in claim 1 further comprising:
   placing said published message in said subscription queue in response to determining said published message is to be delivered to a subscriber.

8. A computer program product for efficiently utilizing a subscription queue, the computer program product comprising a non-transitory computer readable storage medium having program code embodied therewith, the program code comprising the programming instructions for:
   receiving, by a publication engine, a set of filter expressions and utilizations of said subscription queue at which to apply each filter expression, wherein said subscription queue stores messages matching a subscription, wherein said publication engine is an intermediary between publishers and subscribers;
   receiving a published message relating to said subscription;
   checking, by said publication engine, said subscription queue designated in said subscription for its utilization in response to receiving said published message;
   determining, by said publication engine, an appropriate filter expression from said set of filter expressions to be utilized based on said utilization of said subscription queue; and
   applying, by said publication engine, said appropriate filter expression from said set of filter expressions.

9. The computer program product as recited in claim 8, wherein said publication engine comprises a subscriber mechanism at which a subscriber registers said subscription.

10. The computer program product as recited in claim 9, wherein said subscriber mechanism comprises subscriber settings comprising a name of said subscription queue to receive published messages and subscriber criteria.

11. The computer program product as recited in claim 10, wherein said subscriber criteria comprises one or more topics of interest of said subscriber.

12. The computer program product as recited in claim 10, wherein said subscriber settings further comprise content-based filter settings comprising multiple filter expressions to be applied at different subscription queue utilizations.

13. The computer program product as recited in claim 9, wherein the program code further comprises the programming instructions for:
   identifying said subscription in said subscriber mechanism for which said published message is valid in response to receiving said published message.

14. The computer program product as recited in claim 8, wherein the program code further comprises the programming instructions for:
   placing said published message in said subscription queue in response to determining said published message is to be delivered to a subscriber.

15. A system, comprising:
   a memory for storing a computer program for efficiently utilizing a subscription queue; and
   a processor connected to said memory, wherein said processor is configured to execute the program instructions of the computer program comprising:
      receiving, by a publication engine, a set of filter expressions and utilizations of said subscription queue at which to apply each filter expression, wherein said subscription queue stores messages matching a subscription, wherein said publication engine is an intermediary between publishers and subscribers;

receiving a published message relating to said subscription;

checking, by said publication engine, said subscription queue designated in said subscription for its utilization in response to receiving said published message;

determining, by said publication engine, an appropriate filter expression from said set of filter expressions to be utilized based on said utilization of said subscription queue; and applying, by said publication engine, said appropriate filter expression from said set of filter expressions.

16. The system as recited in claim 15, wherein said publication engine comprises a subscriber mechanism at which a subscriber registers said subscription.

17. The system as recited in claim 16, wherein said subscriber mechanism comprises subscriber settings comprising a name of said subscription queue to receive published messages and subscriber criteria.

18. The system as recited in claim 17, wherein said subscriber criteria comprises one or more topics of interest of said subscriber.

19. The system as recited in claim 17, wherein said subscriber settings further comprise content-based filter settings comprising multiple filter expressions to be applied at different subscription queue utilizations.

20. The system as recited in claim 16, wherein the program instructions of the computer program further comprise:

identifying said subscription in said subscriber mechanism for which said published message is valid in response to receiving said published message.

* * * * *